(12) United States Patent
Yamashita et al.

(10) Patent No.: US 8,165,541 B2
(45) Date of Patent: Apr. 24, 2012

(54) RADIO TRANSMITTER FOR MODULATING A CARRIER WAVE

(75) Inventors: Shuji Yamashita, Nagoya (JP);
Hidemitsu Kawashima, Seto (JP);
Akitomo Tanaka, Kasugai (JP); Yasushi Hatakeyama, Yokkaichi (JP)

(73) Assignee: OMRON Automotive Electronics Co., Ltd., Aichi (JP)

( * ) Notice: Subject to any disclaimer, the term of this patent is extended or adjusted under 35 U.S.C. 154(b) by 384 days.

(21) Appl. No.: 12/483,893

(22) Filed: Jun. 12, 2009

(65) Prior Publication Data

US 2009/0311977 A1 Dec. 17, 2009

(30) Foreign Application Priority Data

Jun. 13, 2008 (JP) ................................. 2008-155199

(51) Int. Cl.
*H01Q 11/12* (2006.01)
*H04B 1/04* (2006.01)

(52) U.S. Cl. ..................................... 455/118; 455/127.2

(58) Field of Classification Search .................... 455/91, 455/118, 120, 121, 125, 127.1, 127.2, 522; 340/10.1, 10.4; 375/295
See application file for complete search history.

(56) References Cited

U.S. PATENT DOCUMENTS

| | | | |
|---|---|---|---|
| 3,694,803 A * | 9/1972 | Strenglein | 340/447 |
| 7,319,380 B2 * | 1/2008 | Schulze et al. | 340/447 |
| 7,710,274 B2 * | 5/2010 | Choi et al. | 340/572.7 |
| 2005/0007239 A1 * | 1/2005 | Woodard et al. | 340/10.2 |
| 2006/0132325 A1 * | 6/2006 | Fujii et al. | 340/825.69 |
| 2006/0214780 A1 * | 9/2006 | Mathias et al. | 340/442 |
| 2011/0026565 A1 * | 2/2011 | Rofougaran | 375/136 |

FOREIGN PATENT DOCUMENTS

JP 2006-174154 A 6/2006

* cited by examiner

*Primary Examiner* — Nguyen Vo
(74) *Attorney, Agent, or Firm* — Osha Liang LLP (57) ABSTRACT

A radio transmitter for modulating a carrier wave in a predetermined frequency with given information to transmit the modulation signal through an antenna having a predetermined resonance frequency f1 has a frequency changing section that changes the frequency of the carrier wave. The frequency changing section changes the frequency of the carrier wave to one of the resonance frequency f1 and a frequency f1×1/n, (wherein n is a given integer of at least 2, to change transmission output power.

2 Claims, 8 Drawing Sheets

| Duty | Order |
|---|---|
|  | 1 |
| 0.50 | 0.64 |
| 0.45 | 0.62 |
| 0.40 | 0.58 |
| 0.35 | 0.51 |
| 0.30 | 0.42 |
| 0.25 | 0.32 |
| 0.20 | 0.22 |
| 0.15 | 0.13 |
| 0.10 | 0.06 |
| 0.05 | 0.02 |

| Duty | 1 | 2 | 3 | 4 | 5 | 6 | 7 | 8 | 9 | 10 |
|---|---|---|---|---|---|---|---|---|---|---|
| 0.50 | 0.64 | 0.00 | 0.21 | 0.00 | 0.13 | 0.00 | 0.09 | 0.00 | 0.07 | 0.00 |

| Duty | Harmonic order | | | | | | | | | |
|---|---|---|---|---|---|---|---|---|---|---|
| | 1 | 2 | 3 | 4 | 5 | 6 | 7 | 8 | 9 | 10 |
| 0.50 | 0.64 | (0.00) | 0.21 | (0.00) | 0.13 | (0.00) | 0.09 | (0.00) | 0.07 | (0.00) |
| 0.45 | 0.62 | 0.03 | 0.17 | 0.05 | 0.06 | 0.07 | 0.02 | 0.07 | (0.00) | 0.06 |
| 0.40 | 0.58 | 0.11 | 0.07 | 0.14 | 0.00 | 0.10 | 0.03 | 0.03 | 0.06 | (0.00) |
| 0.35 | 0.51 | 0.21 | 0.01 | 0.14 | 0.06 | 0.01 | 0.09 | 0.03 | 0.01 | 0.06 |
| 0.30 | 0.42 | 0.29 | 0.02 | 0.05 | 0.13 | 0.04 | 0.01 | 0.07 | 0.05 | (0.00) |
| 0.25 | 0.32 | 0.32 | 0.11 | (0.00) | 0.06 | 0.11 | 0.05 | (0.00) | 0.04 | 0.06 |
| 0.20 | 0.22 | 0.29 | 0.19 | 0.05 | 0.00 | 0.04 | 0.08 | 0.07 | 0.02 | (0.00) |
| 0.15 | 0.13 | 0.21 | 0.21 | 0.14 | 0.06 | 0.01 | (0.00) | 0.03 | 0.06 | 0.06 |
| 0.10 | 0.06 | 0.11 | 0.14 | 0.14 | 0.13 | 0.10 | 0.06 | 0.03 | 0.01 | (0.00) |
| 0.05 | 0.02 | 0.03 | 0.04 | 0.05 | 0.06 | 0.07 | 0.07 | 0.07 | 0.07 | 0.06 |

RADIO TRANSMITTER FOR MODULATING A CARRIER WAVE

BACKGROUND OF THE INVENTION

1. Technical Field

The present invention relates to radio transmitters, in particular, a radio transmitter that requires fluctuation adjustment for transmission output power.

2. Related Art

Typically, radio transmitters (hereinafter, simply referred to as transmitters) have been used in various fields including the communication field. One example of these radio transmitters allows fluctuation adjustment for transmission output power in order to restrict a communication area. Such a transmitter is used in a so-called passive entry system, a tire pneumatic pressure monitoring system and the like for vehicles such as an automobile (hereinafter, simply referred to as vehicles).

The passive entry system is configured with an in-vehicle device and a portable device whereas the tire pneumatic pressure monitoring system is configured with an in-vehicle device and a sensor unit. In the passive entry system, the in-vehicle device transmits, to the portable device, response request signals (e.g., a signal for activating the portable device, a signal for requesting transmission of an ID number). In the tire pneumatic pressure monitoring system, likewise, the in-vehicle device transmits response request signals to the sensor unit. In any of the systems, the in-vehicle device receives a response signal from the portable device or the sensor unit to perform a required operation based on the response signal. More specifically, the in-vehicle device in the passive entry system performs locking or unlocking of a door. On the other hand, the in-vehicle device in the tire pneumatic pressure monitoring system determines whether a tire has a satisfactory pneumatic pressure and then gives a warning if the pneumatic pressure is unsatisfactory.

Each of the in-vehicle devices in these systems is a "transmitter" that allows fluctuation adjustment for transmission output power. The reason that the in-vehicle device requires the fluctuation adjustment for transmission output power is described below. In the passive entry system, the in-vehicle device must grasp a position of the portable device, that is, must determine whether the portable device is present inside or outside a vehicle. If the in-vehicle device fails to grasp the position of the portable device, there is a possibility that the in-vehicle device locks a door with the portable device being left inside the vehicle. In the tire pneumatic pressure monitoring system, moreover, the in-vehicle device must establish communications with the sensor unit attached to each tire. Herein, excessively large transmission output power causes disadvantageous communications between the in-vehicle device and the sensor unit other than the target sensor unit. On the other hand, excessively small transmission output power causes failure of appropriate communications between the in-vehicle device and the target sensor unit. In order to solve these problems, the transmission output power described above must be optimized for each model of vehicles. Consequently, variations in shape of vehicles cause a change in optimal transmission output power.

In the tire pneumatic pressure monitoring system, further, the in-vehicle device does not necessarily grasp a position of the sensor unit, but requires adjustment for transmission output power in order to establish communications with only the target sensor unit as in the case of the in-vehicle device in the passive entry system. It is assumed herein that the tire pneumatic pressure monitoring system is applied to a four-wheel vehicle. In this case, the sensor units are attached to left and right front tires, left and right rear tires, and a spare tire, respectively. Further, antennas are provided on tire housings for the left and right front wheels, tire housings for the left and right rear wheels, and a storage section (e.g., a trunk room) for the spare tire. Herein, these antennas are driven in turn to transmit a response request signal from the in-vehicle device to the corresponding sensor units. In a case where the antenna provided on the tire housing for the left front wheel transmits a response request signal with appropriate transmission output power, probably, only the sensor unit attached to the left front tire transmits a response signal to the antenna in a stable manner. However, if the transmission output power is excessively large, there is a possibility that the sensor unit for the different tire (the right front tire in this case) erroneously makes a response. Alternatively, if the transmission output power is excessively small, there is a possibility that the sensor unit for the target tire (the left front tire in this case) fails to make a response. In order to solve these problems, actually, tests are conducted by trial and error while adjusting fluctuation of the transmission output power in order to find the appropriate transmission output power. These tests must be conducted for each model of vehicles because a size of a tire, a shape of a tire housing, and the like are unique to each model.

As a conventional technique about fluctuation adjustment for transmission output power, for example, there has also been known that disclosed in JP 2006-174154A. In summary, this conventional technique adopts (1) a method of changing a power supply voltage of a transmitting part, (2) a method of changing a transmission frequency and (3) a method of changing a duty of a rectangular waveform of a transmission signal (i.e., a ratio of occupation by ON periods in one cycle length of a waveform) singly or in combination to achieve the fluctuation adjustment for transmission output power.

According to the method (1), fluctuation adjustment for transmission output power is performed in such a manner that an amplitude of a transmission signal is changed. According to the method (2), moreover, fluctuation adjustment for transmission output power is performed by use of a frequency response characteristic of a transmission antenna of a transmitter in a vehicle and that of an antenna of a receiver (e.g., the portable device or the sensor unit in the example described above). According to the method (3), further, fluctuation adjustment for transmission output power is performed in accordance with a ratio of occupation by ON periods in one cycle length of a waveform.

However, this conventional technique has the following disadvantage.

In the method (2), a reception sensitivity depends on a frequency response characteristic of a reception antenna. Consequently, an antenna having a high Q value causes a significant change in sensitivity only when a frequency varies slightly. For this reason, the sensitivity can be adjusted with good accuracy only in a range where the reception sensitivity does not vary largely around a specified frequency (typically 125 KHz). Further, the adjustment for the sensitivity becomes more difficult in a case where a frequency response characteristic of an antenna is unique to each product.

SUMMARY

One or more embodiments of the present invention provides a radio transmitter that changes a reception sensitivity of a receiver by use of a method which is different from the method (2) described above.

A first aspect of the present invention is directed to a radio transmitter for modulating a carrier wave in a predetermined frequency with given information to transmit the modulation signal through an antenna having a predetermined resonance frequency f1. This radio transmitter includes a frequency changing section that changes the frequency of the carrier wave. Herein, the frequency changing section changes the frequency of the carrier wave to one of the resonance frequency f1 and a frequency f1×1/n (n: a given integer of not less than 2) to change transmission output power.

In a second aspect of the present invention, the radio transmitter according to the first aspect further includes a duty setting section that sets, when the carrier wave is a rectangular waveform in which ON periods and OFF periods are repeated in predetermined cycles, a ratio (a duty) of occupation by one of the ON periods and OFF periods in one cycle of the waveform. Herein, the frequency changing section performs the operation for changing the transmission output power when the duty setting section sets a predetermined duty.

The radio transmitter according to one or more embodiments of the present invention changes the frequency of the carrier wave by use of the harmonic wave of the resonance frequency of the transmission antenna. Therefore, the radio transmitter can largely change the transmission output power with ease.

DETAILED DESCRIPTION

With reference to the drawings, hereinafter, description will be given of one embodiment of the present invention applied to a passive entry system for a vehicle.

First, description will be given of a configuration.

Figure 1:
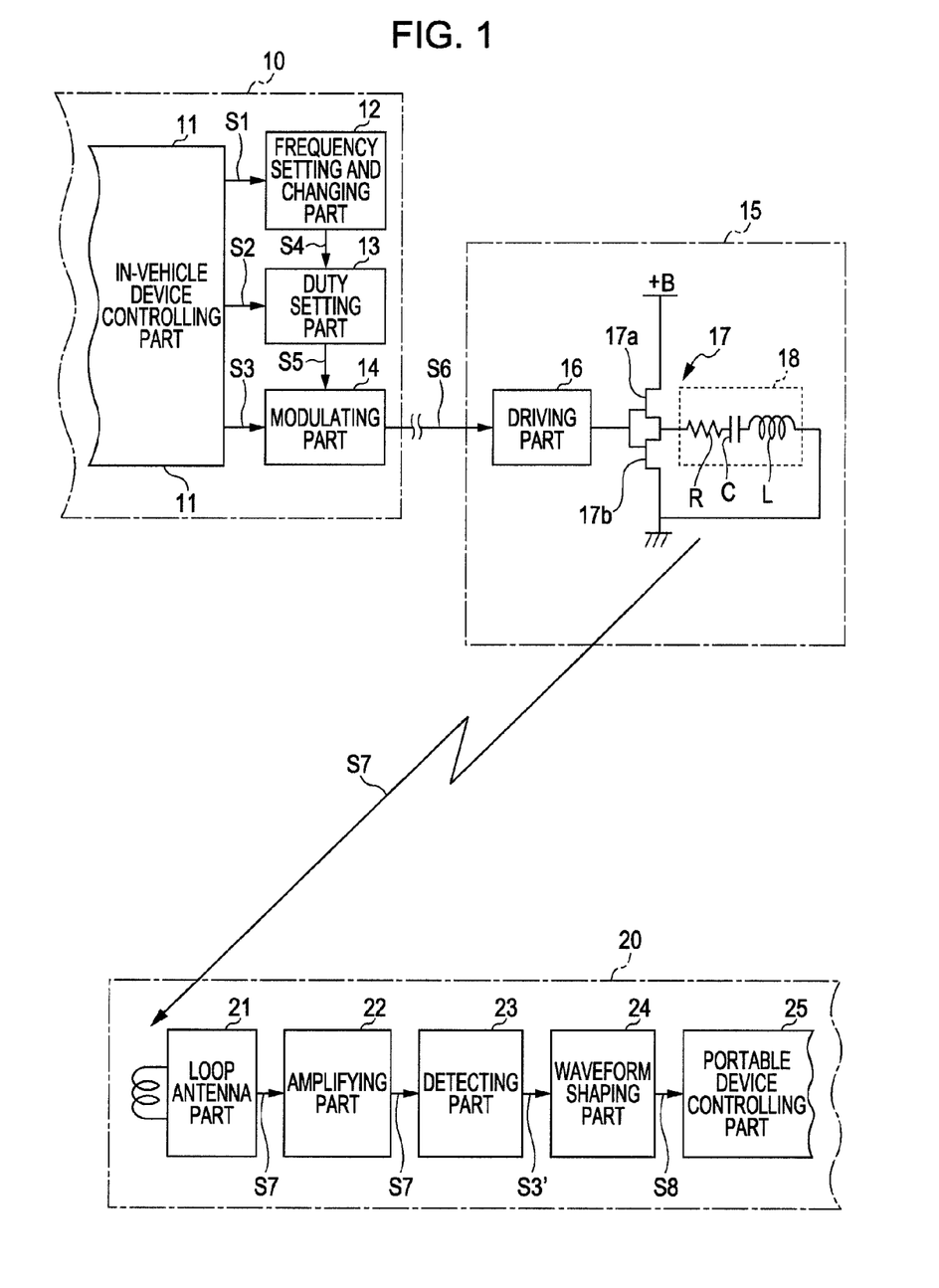
FIG. 1 shows a configuration of a system according to one embodiment of the present invention.

FIG. 1 shows the configuration of the system according to this embodiment. As shown in FIG. 1, an in-vehicle device 10 serves as a "transmitter" and includes an in-vehicle device controlling part 11, a frequency setting and changing part 12, a duty setting part 13 and a modulating part 14. Moreover, an antenna 15 is connected to the in-vehicle device 10 and includes a driving part 16, a switching element 17 and an antenna element 18. Further, a portable device 20 includes a loop antenna part 21, an amplifying part 22, a detecting part 23, a waveform shaping part 24 and a portable device controlling part 25.

Herein, the in-vehicle device 10 including the in-vehicle device controlling part 11 is configured with a control element adopting a program control scheme, that is, circuitry including a microcomputer and a nonvolatile memory; however, the present invention is not limited thereto. For example, functions to be executed by the microcomputer may be partly or entirely realized by different pieces of hardware. In other words, a form for realizing the function is not particularly limited in the present invention.

Figure 2:
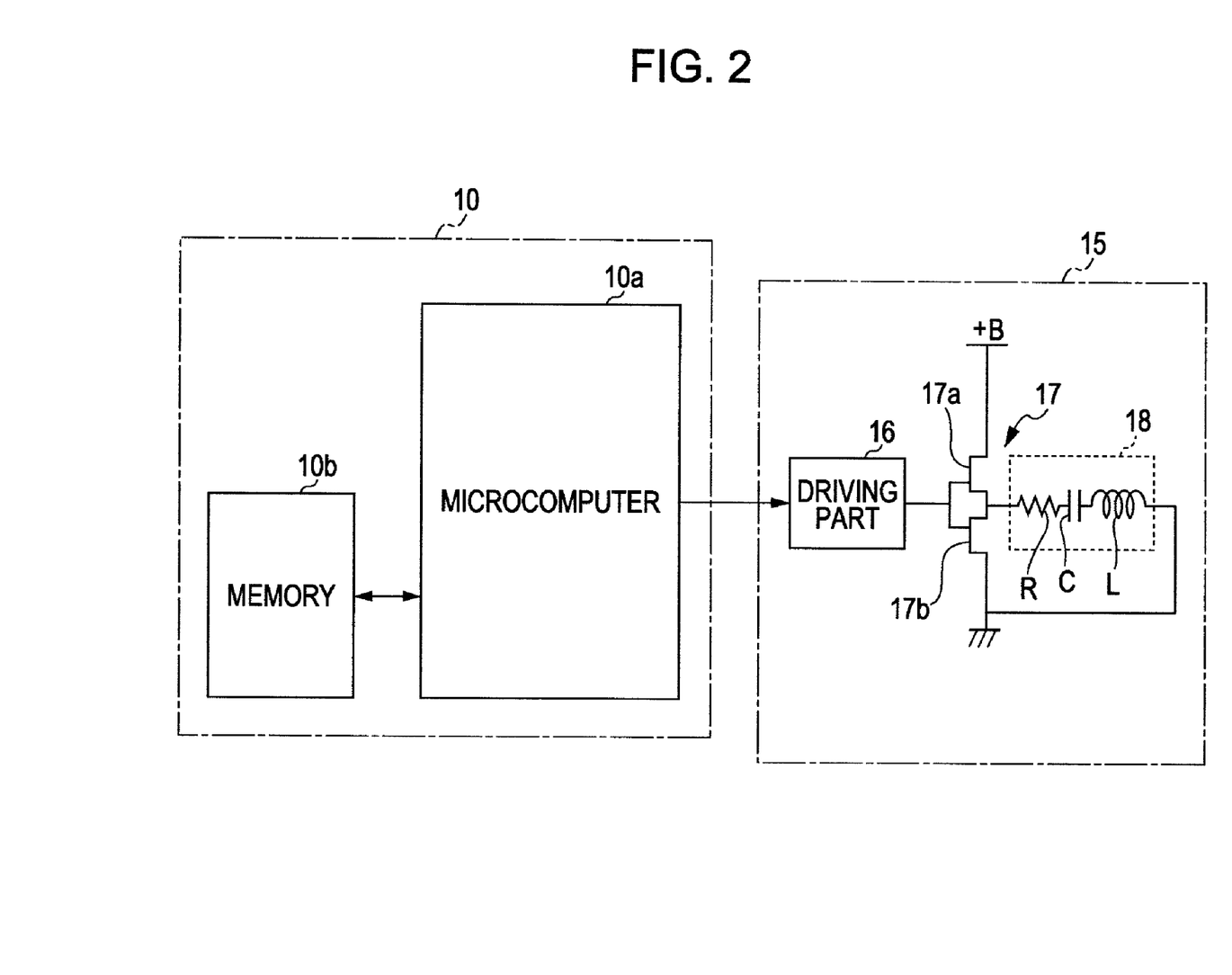
FIG. 2 conceptually shows a case where an in-vehicle device including an in-vehicle device controlling part is configured with a control element adopting a program control scheme.

FIG. 2 conceptually shows the case where the in-vehicle device 10 including the in-vehicle device controlling part 11 is configured with the control element adopting the program control scheme. In FIG. 2, a microcomputer 10a serves as the in-vehicle device controlling part 11, executes a control program which is previously stored in a memory 10b, generates a transmission signal by modulating a carrier wave based on predetermined data, and outputs the transmission signal to the driving part 16. The driving part 16 drives the switching element 17 based on the transmission signal, so that the transmission signal is transmitted through the antenna element 18 in a wireless manner.

The microcomputer 10a performs frequency division on a clock thereof to generate a signal which is repetitively turned on and off at 250 KHz, for example. Then, the microcomputer 10a outputs the signal to the outside to generate a carrier wave in 125 KHz in a duty ratio of 50%. Based on the predetermined data, further, the microcomputer 10a outputs the carrier wave in a case where the data is 1 and stops the output of the carrier wave in a case where the data is 0. Thus, the microcomputer 10a modulates the carrier wave, based on the predetermined data. A change in frequency of the carrier wave can be realized by a change in dividing ratio of the clock. Likewise, a change in duty ratio of the carrier wave can be realized by the change in dividing ratio of the clock.

Figure 3:
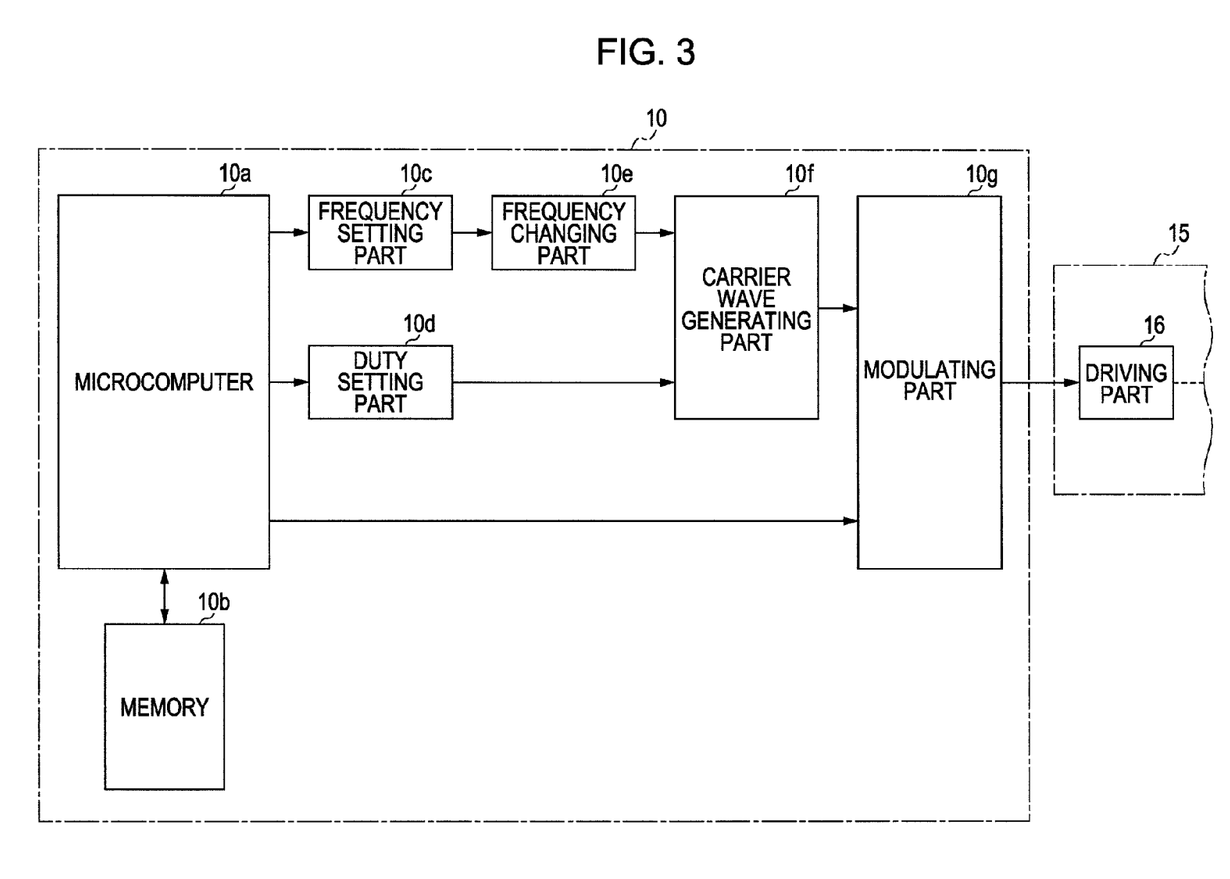
FIG. 3 shows a configuration of the in-vehicle device the functions of which are partly realized by different pieces of hardware.

FIG. 3 shows a configuration in the case where the functions of the in-vehicle device 10 are partly realized by the different pieces of hardware. As shown in FIG. 3, the in-vehicle device 10 further includes a frequency setting part 10c, a duty setting part 10d, a frequency changing part 10e, a carrier wave generating part 10f and a modulating part 10g, in addition to the microcomputer 10a and the memory 10b.

Herein, the frequency setting part 10c and the frequency changing part 10e correspond to the frequency setting and changing part 12 shown in FIG. 1. The duty setting part 10d corresponds to the duty setting part 13 shown in FIG. 1. The carrier wave generating part 10f and the modulating part 10g correspond to the modulating part 14 shown in FIG. 1.

The in-vehicle device controlling part 11 executes a process of regularly controlling the frequency setting and changing part 12 (the frequency setting part 10c and the frequency changing part 10e), the duty setting part 13 (the duty setting part 10d) and the modulating part 14 (the carrier wave generating part 10f and the modulating part 10g), generating harmonic response request signals (e.g., a request for sending an ID number) to the portable device 20, and emitting (transmitting) the response request signal to a space via the antenna 15. In the following, this process is referred to as a transmission process.

Herein, the in-vehicle device controlling part 11 also executes a process of receiving, at a receiving part (not shown), a response signal sent back from the portable device 20 in response to the response request signal, determining whether an ID number contained in the response signal, that is, identification information unique to the portable device 20 is coincident with an ID number for collation which is previously stored in the memory 10b, and controlling locking or unlocking of a door, and the like when the two ID numbers are coincident with each other. However, this process is not directly related to the present invention; therefore, description thereof will not be given here.

Figure 4:
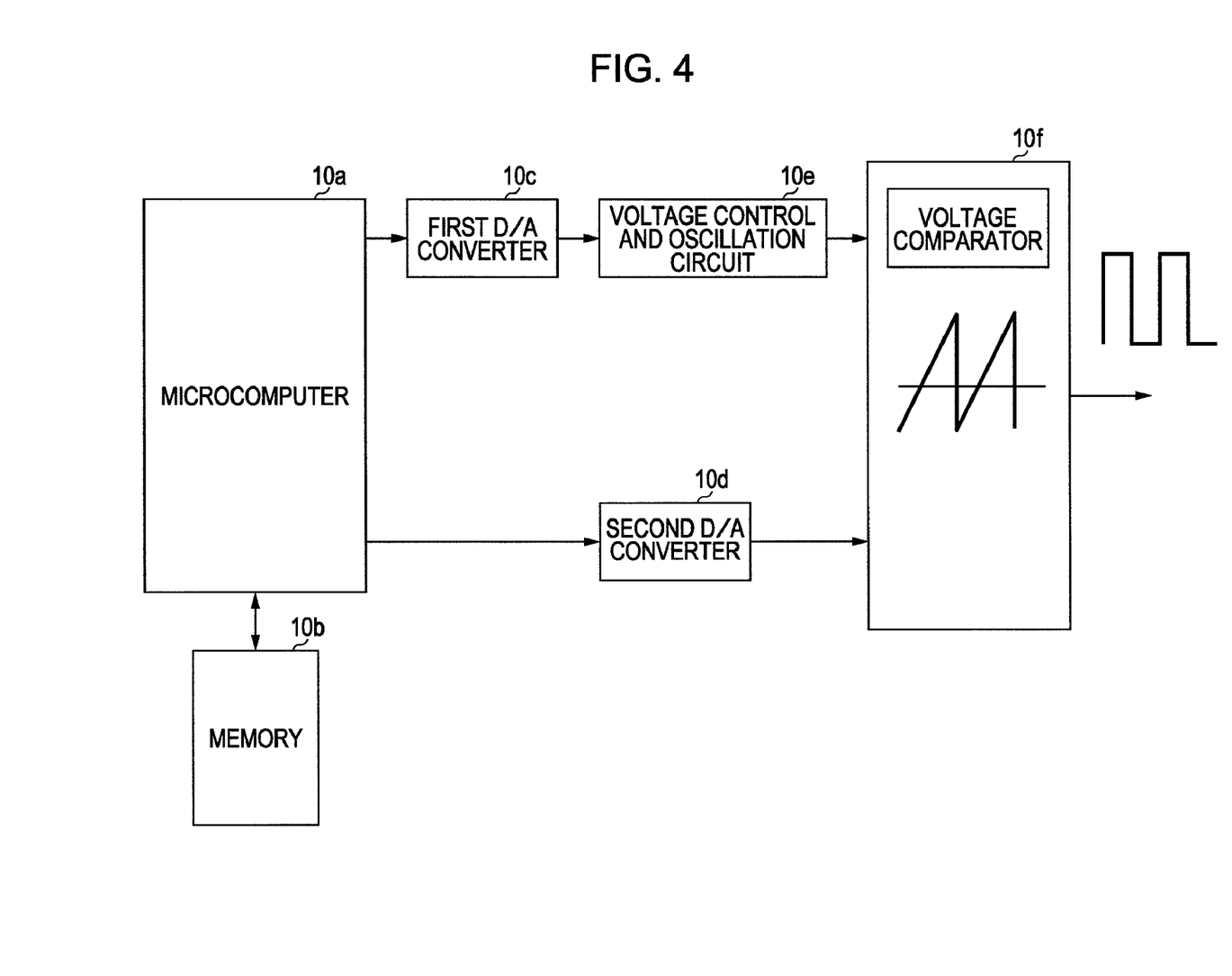
FIG. 4 shows one example of the detailed configuration shown in FIG. 3.

FIG. 4 shows one example of the detailed configuration shown in FIG. 3. As shown in FIG. 4, the microcomputer 10a outputs a command value to a first D/A converter which is the frequency setting part 10c in order to execute the transmission process described above. The frequency setting part 10c (the first D/A converter) outputs a signal having a voltage value based on the command value to a voltage control and oscillation circuit which is the frequency changing part 10e. The frequency changing part 10e (the voltage control and oscillation circuit) outputs a signal having a frequency in accordance with the received voltage value. This signal is a sawtooth wave having a predetermined frequency, for example.

Moreover, the microcomputer 10a outputs a command value to a second D/A converter which is the duty setting part 10d. A voltage comparator which is the carrier wave generating part 10f receives the sawtooth wave from the frequency changing part 10e (the voltage control and oscillation circuit) and a signal from the duty setting part 10d (the second D/A converter), compares the sawtooth wave with a voltage value of the signal, and outputs a rectangular wave. A change in voltage value of the signal from the duty setting part 10d (the second D/A converter) causes a change in duty ratio of the rectangular wave. Further, the carrier wave generating part 10f (the voltage comparator) outputs a base-band signal S3 of the response request signal to the modulating part 14 (the modulating part 10g).

The modulating part 14 (the modulating part 10g) performs ASK (Amplitude Shift Keying) modulation on a carrier wave signal S5 by use of the base-band signal S3 to obtain a modulation signal S6, and outputs the modulation signal S6 as a response request signal to the antenna 15.

In the antenna 15, the driving part 16 drives the complementary switching element 17 by use of the modulation signal S6. Then, the switching element 17 activates a first switch element 17a (deactivates a second switch element 17b) during an ON period of the carrier wave contained in the modulation signal S6 to apply a battery potential (+B) to the antenna element 18. Alternatively, the switching element 17 activates the second switch element 17b (deactivates the first switch element 17a) during an OFF period of the carrier wave contained in the modulation signal S6 to apply a ground potential to the antenna element 18. The antenna element 18 can be regarded as a series circuit of a resistance component R, a capacitance component C and a reactance component L, in terms of an equivalent aspect. This series circuit is charged at the high potential (+B) during the ON period of the carrier wave contained in the modulation signal S6 and is discharged at the ground potential during the OFF period of the carrier wave contained in the modulation signal S6, in a repetitive manner. Thus, the series circuit generates a response request signal S7 containing an electric field component corresponding to a change in voltage/current of the carrier wave contained in the modulation signal S6, and then emits (transmits) the response request signal S7 to the ambient space.

In the portable device 20, the loop antenna part 21 receives the response request signal S7. Herein, the loop antenna part 21 receives only a signal having a specific frequency component (the response request signal S7 in this embodiment) in a significantly efficient manner, by virtue of a predetermined resonance characteristic. However, this characteristic has a width of a center frequency f1±α (Hz). Therefore, the loop antenna part 21 permits passing of different frequency components corresponding to "±α". Herein, it is assumed for convenience of the description that the loop antenna part 21 permits passing of only the component in the frequency f1 in the carrier wave contained in the response request signal S7.

The amplifying part 22 amplifies a signal having a specific frequency component, that is, the response request signal S7 received by the loop antenna part 21. The detecting part 22 detects all ranges of the response request signal S7 and reproduces a response request signal (a response request signal S3') in the base band. The waveform shaping part 24 shapes a waveform of the response request signal S3' returned to the base band and converts the response request signal S3' to a binarization signal S8. The portable device controlling part 25 receives the binarization signal S8 and reads an ID number from a memory (not shown). Then, the portable device controlling part 25 generates a response signal containing the ID number and transmits the response signal through a transmitting part (not shown).

Next, description will be given of operations in this embodiment.

First, description will be given of an operation for changing a duty to adjust fluctuation of transmission output power.

Figure 5A:
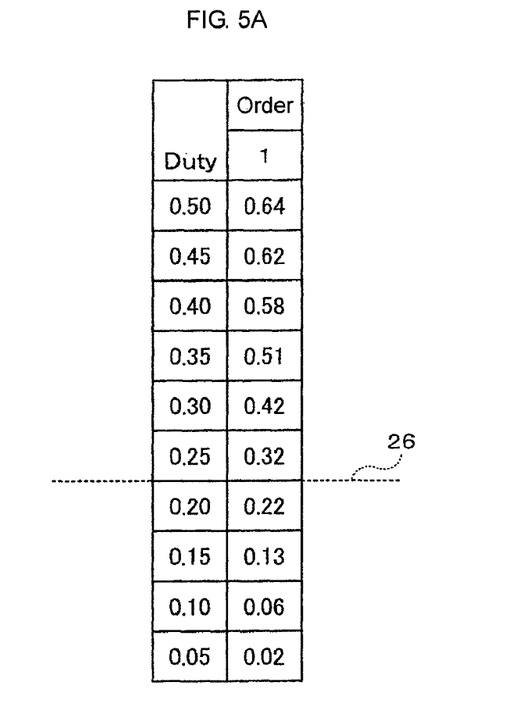
FIG. 5A shows a relation between a duty and transmission output power.

FIG. 5A shows a table of a relation between the duty and the transmission output power. As shown in FIG. 5A, this table includes a duty field that shows a command value of a duty changeable signal S2 output from the in-vehicle device controlling part 11 to the duty setting part 13. As described above, the duty is "a ratio of occupation by ON periods in one cycle length of a waveform", and is expressed by B/A wherein A represents one cycle length of the waveform and B represents the ratio of the ON periods. As shown in FIG. 5A, for example, the duty field shows ten command values (0.50, 0.45, 0.40, 0.35, 0.30, 0.25, 0.20, 0.15, 0.10, 0.05) each of which corresponds to B in a case where A is 1.

The table also includes an order field provided at the right-hand side of the duty field. The frequency of the carrier wave signal S4 generated by the frequency setting and changing part 12 is an order of a harmonic wave relative to a fundamental wave (f1). Herein, the order is 1; therefore, the frequency of the carrier wave signal S4 is the fundamental wave (f1). The fundamental wave is 125 KHz, for example.

As shown in FIG. 5A, the order field shows ten numeric values which become gradually small from above, that is, 0.64, 0.62, 0.58, 0.51, 0.42, 0.32, 0.22, 0.13, 0.06 and 0.02 in descending numeric order. Each of these numeric values corresponds to a ratio of adjustment for reduction of the transmission output power. For example, the numeric value of 0.64 means that the transmission output power multiplies 0.64-fold (i.e., the transmission output power is reduced by 64%). Moreover, the numeric value of 0.02 means that the transmission output power multiplies 0.02-fold (i.e., the transmission output power is reduced by 2%).

Accordingly, it is apparent from FIG. 5A that the optional change of the duty from 0.50 to 0.05 of the carrier wave signal S4 in the case of the order of 1 (the fundamental wave f1) allows gradual adjustment from the maximum 0.64-fold transmission output power to the minimum 0.02-fold transmission output power. The idea (3) in the conventional technique described above is based on this principle.

The respective values in FIG. 5A are obtained by the following calculation.

First, a general equation for Fourier series expansion of a distorted wave such as a rectangular wave is expressed as follows.

$$f(t) = b_0 + \sum_{n=1}^{\infty}(b_n \cos n\omega t + a_n \sin n\omega t) \qquad (1)$$

$$= b_0 + \sum_{n=1}^{\infty}\sqrt{a_n^2 + b_n^2}\sin\left(n\omega t + \tan^{-1}\frac{b_n}{a_n}\right)$$

Herein, the following relationships are established.

$$b_0 = \frac{1}{T}\int_0^T f(t)\,dt \qquad (2)$$

$$b_n = \frac{2}{T}\int_0^T f(t)\cos n\omega t\,dt \qquad (3)$$

$$a_n = \frac{2}{T}\int_0^T f(t)\sin n\omega t\,dt \qquad (4)$$

Moreover, the function of the waveform is expressed by the following equation.

$$f(t) = \begin{cases} 1 & (0 < t < PT) \\ 0 & (PT < t < T) \end{cases} \qquad (5)$$

In this equation, P represents the duty and T represents the cycle. The resultant function is substituted into a general equation to obtain constants $a_0$, $b_n$ and $a_n$.

$$b_0 = P \qquad (6)$$

$$b_n = \frac{1}{n\pi}\sin(2\pi n P) \qquad (7)$$

$$a_n = \frac{1}{n\pi}(1 - \cos(2\pi n P)) \qquad (8)$$

Then, the amplitude is calculated from the following equation.

$$\sqrt{a_n^2 + b_n^2} = \frac{1}{n\pi}(1 - \cos(2\pi n P)) \qquad (9)$$

Herein, the amplitude characteristic shown in FIG. 5A is attained when the duty P is changed in the case of the order n of 1. As a result, it can be theoretically demonstrated that the duty changes the transmission output power.

However, the studies conducted by the present inventors revealed that the reduction in duty at a certain level hinders attainment of the effect of reducing the transmission output power. The principal reason therefor is described below. That is, it is considered that since the ratio (B) of occupation by the ON periods in one cycle length of the waveform becomes considerably small, the circuit element (particularly, the switching element 17 of the antenna 15) fails to make a response. In FIG. 5A, a limit line 26 is a border where this reduction effect is not attained. Herein, this reduction effect is not attained when the duty is not more than 0.20.

As described above, there remains a disadvantage that limitation is imposed on an amount of adjustment for reduction of the transmission output power even when only the duty is changed. In this embodiment, attention is given to a "harmonic wave" of the carrier wave signal S4 generated by the frequency setting and changing part 12. The disadvantage described above is eliminated by use of this harmonic wave in order to increase the amount of adjustment for reduction of the transmission output power. This harmonic wave is used for the following reason. That is, in a case where the carrier wave signal is a distorted wave such as a rectangular wave, a harmonic wave component is contained in the carrier wave signal.

Figure 5B:
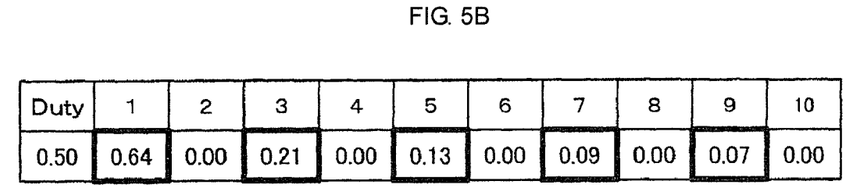
FIG. 5B shows a change of the transmission output power in a case where a harmonic order is changed with the duty being fixed.

FIG. 5B shows changes in amplitude of a first-order harmonic wave (i.e., the fundamental wave f1) and an nth-order harmonic wave of the carrier wave signal S4 in a case where the duty is fixed. Herein, the duty is fixed to 0.50, for example. The order of 1 is the fundamental wave f1 whereas each of the orders of 2, 3, ... and 10 is a harmonic order. The fundamental wave in the case of the order of 1 is referred to as a first harmonic wave (f1). Likewise, the harmonic wave in the case of the order of 2 is referred to as a second harmonic wave (f2), the harmonic wave in the case of the order of 3 is referred to as a third harmonic wave (f3), and the harmonic wave in the case of the order of 10 is referred to as a tenth harmonic wave (f10). FIG. 5B shows the fundamental wave (the first harmonic wave f1) to the tenth harmonic wave (f10) each of which is merely one example. The number of harmonic orders may be increased or decreased if necessary.

It is apparent from FIG. 5B that when the duty is 0.50, the transmission output power is gradually reduced to 0.64, 0.21, 0.13, 0.09 and 0.07 in the odd orders (1, 3, 5, 7, 9). As shown in FIG. 5B, the transmission output power is gradually reduced only in the odd orders because the duty is fixed to 0.50. As will be described later, when the duty is changed to a different value other than 0.50, the transmission output power can be gradually reduced in the even orders as in the case of the odd orders.

The gradual reduction of the transmission output power by use of the harmonic order is based on such a principle that "magnitude of a harmonic wave of a distorted wave such as a rectangular wave becomes gradually small at every order with respect to magnitude of a fundamental wave in a case of an order of 1."

In a case of a rectangular wave, when the duty P is 0.5, both the constants $b_0$ and $b_n$ become 0. Therefore, the equation (1) is modified as follows.

$$f(t) = a_n \sum_{n=1}^{\infty}\sin n\omega t \qquad (10)$$

The following relationship is established when this equation is expanded by use of the equation (9).

$$f(t) = (2/n\pi) \qquad (11)$$

$$\sum_{n=1}^{\infty}\sin n\omega t = 2/\pi \times \sin\omega t + (2/2\pi) \times \sin 2\omega t +$$

$$(2/3\pi) \times \sin 3\omega t + (2/4\pi) \times \sin 4\omega t \ldots + (2/n\pi) \times \sin n\omega t \ldots$$

That is, the amplitude of the nth-order harmonic wave is theoretically 1/n of the amplitude of the fundamental wave.

The magnitude of the harmonic wave of the distorted wave such as the rectangular wave satisfies a relation of $D_1 > D_2 > D_3 \ldots > D_n$ wherein $D_n$ (n: an order) represents the amplitude of each order. Use of this relation allows a change in transmission output power upon transmission of the modulation signal S6 from the antenna 15. For example, in a case where the duty P is 0.50 and the frequency of the carrier wave signal S4 is 1/n times as small as 125 KHz which is the frequency of fundamental wave (=125×1/n KHz), the nth-order harmonic wave of the carrier wave signal S4 becomes 125 KHz {=125× (1/n)×n KHz}. As described above, then, the amplitude of the nth-order harmonic wave becomes 1/n of that of the fundamental wave. The antenna 15 is designed to resonate at 125 KHz and therefore transmits the nth-order harmonic wave having the frequency of 125 KHz rather than the frequency of 125×1/n KHz of the carrier wave signal S4. In other words, the antenna 15 transmits the modulation signal S6 containing the carrier wave signal S4 having the frequency of 125×1/n KHz, as a signal the transmission output power of which is reduced to 1/n and which has a carrier wave in 125 KHz.

As described above, the use of the carrier wave in the frequency at which the nth-order harmonic wave becomes equal to the resonance frequency of the transmission antenna allows the change of the transmission output power of the signal to be transmitted from the antenna. By use of the resonance frequency of the antenna, the transmission output power can be changed with relatively high accuracy even when the respective antennas are different in frequency response characteristic (e.g., a Q value) from one another. In a case of adopting a method for dividing a clock to change a frequency of a carrier wave, moreover, a change in dividing ratio allows attainment of the frequency which is 1/n times as small as the fundamental wave with ease and with good accuracy.

Figure 6:
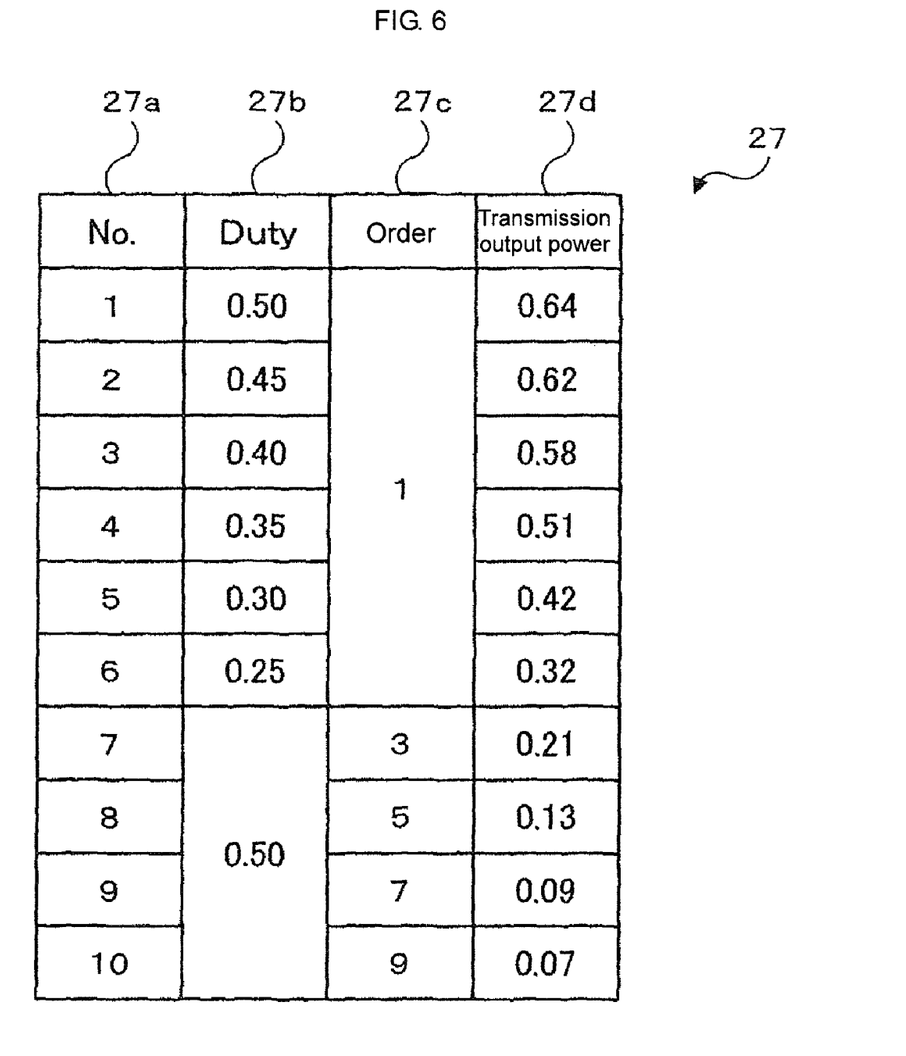
FIG. 6 shows a transmission output power gradual reduction table in the embodiment.

FIG. 6 shows a transmission output power gradual reduction table in this embodiment. Specifically, FIG. 6 shows the change of the transmission output power in a case of changing the duty and frequency of the carrier wave signal S4 of the modulation signal S6. As shown in FIG. 6, the transmission output power gradual reduction table 27 includes a number (No.) field 27a, a duty field 27b, an order field 27c and a transmission output power field 27d.

The number (No.) field 27a shows identification numbers of 1 to 10. The duty field 27b shows duty command values of 0.50 to 0.25. The order field 27c shows order command values of 1 to 9. The transmission output power field 27d shows transmission output power reduction target values of 0.64 to 0.07.

The transmission output power gradual reduction table 27 is previously stored in the in-vehicle device controlling part 11 of the in-vehicle device 10. While referring to the transmission output power gradual reduction table 27, the in-vehicle device controlling part 11 finds an appropriate duty command value and an appropriate order command value in order to attain a required transmission output power reduction target value. Then, the in-vehicle device controlling part 11 generates a frequency selection signal S1 and a duty changeable signal S2 in accordance with these values, and outputs these signals to the frequency setting and changing part 12 and the duty setting part 13, respectively.

As shown in FIG. 6, in the identification numbers 1 to 6, the order is 1 and the duty is 0.50 to 0.25. That is, in the carrier wave signal S4, the frequency is set to the fundamental wave f1 (the order is 1) and the duty is changed to 0.50 to 0.25. On the other hand, in the identification numbers 7 to 10, the duty is fixed (herein, 0.50) and the order is 3, 5, 7 and 9. That is, in the carrier wave signal S4, the duty is fixed to 0.50 and the order is changed to 3, 5, 7 and 9.

Herein, the change of the order to 5 means the change of the frequency such that the fifth-order harmonic wave of the frequency is set to the fundamental wave f1 (e.g., 125 KHz) in the carrier wave signal S4. In other words, the order of 5 indicates that the frequency of the carrier wave signal S4 is set to 25 KHz (=125×1/5 KHz).

The identification Nos. 1 to 6 correspond to the idea (3) in the conventional technique described above whereas the identification Nos. 7 to 10 are unique to this embodiment.

According to this embodiment, a unique effect capable of increasing the amount of adjustment for reduction of the transmission output power can be attained in the identification numbers 7 to 10. The reason therefor is described below. That is, this embodiment is different from the idea (3) in the conventional technique in the point that the duty is not reduced (e.g., the duty is maintained at 0.50), and therefore does not cause the problem that the switching element 17 makes no response.

Figure 7:
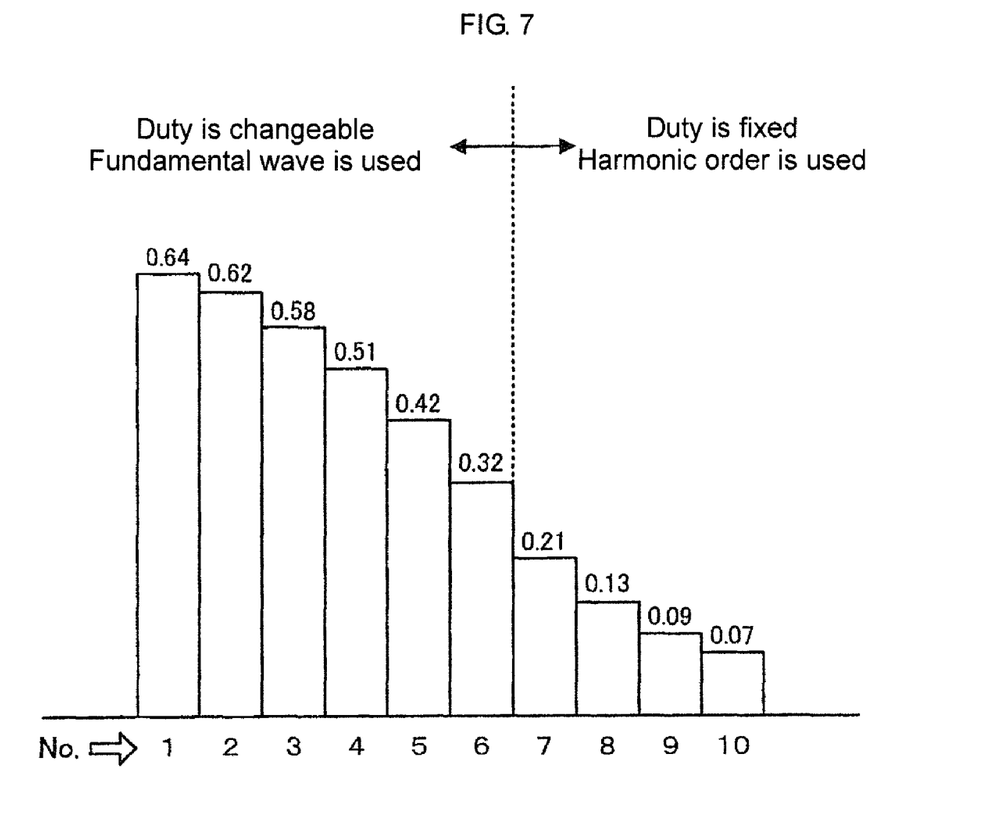
FIG. 7 conceptually shows the change of the transmission output power in the embodiment.

FIG. 7 conceptually shows the change of the transmission output power in this embodiment. As shown in FIG. 7, this embodiment reliably attains an effect of gradual reduction from the 0.64-fold transmission output power to 0.07-fold transmission output power in the identification Nos. 1 to 10 shown in the transmission output power gradual reduction table 27. In the identification Nos. 7 to 10, particularly, the transmission output power is reduced by use of the harmonic order with the duty being unchanged (e.g., with the duty being fixed to 0.50). Therefore, this embodiment does not cause the disadvantage described above (the problem that the switching element 17 makes no response). Accordingly, this embodiment can attain the unique effect capable of stably increasing the amount of adjustment for reduction of the transmission output power.

In the foregoing description, the order of the harmonic wave is an odd number (3, 5, 7, 9); however, the present invention is not limited thereto. The odd order is used because the duty is fixed to 0.50 as described above. The even order (2, 4, 6, 8, 10) of the harmonic wave can be used when the duty is fixed to a different value other than 0.50.

Figure 8:
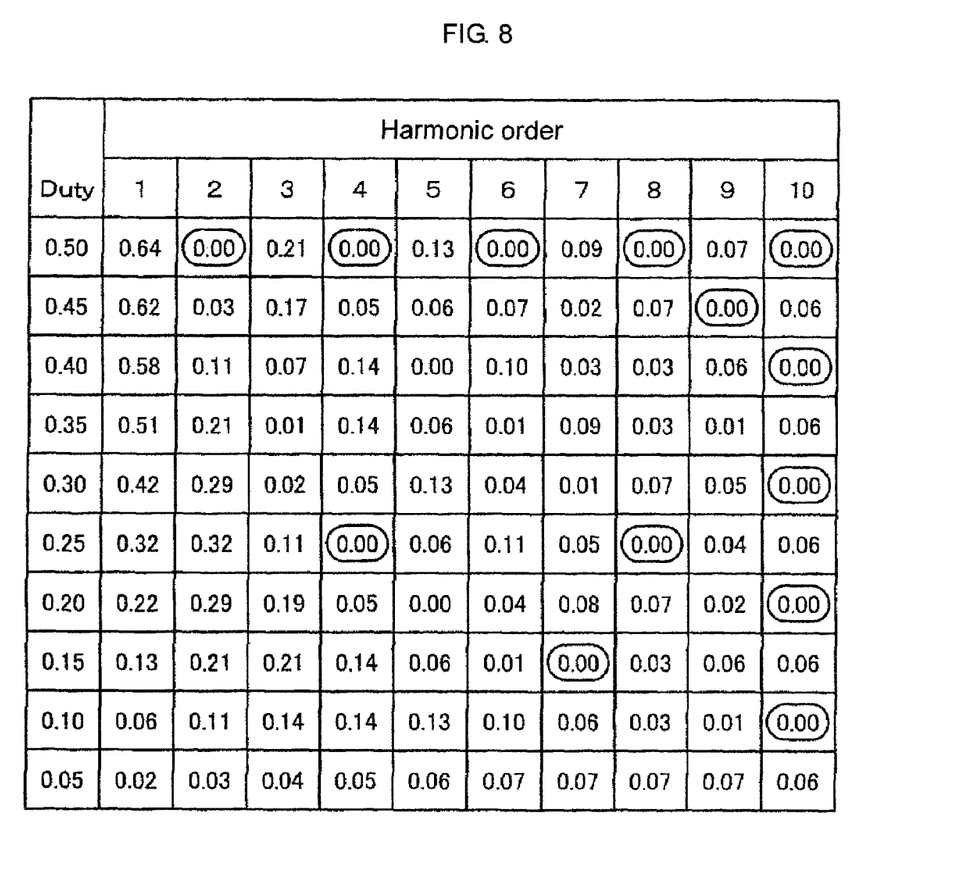
FIG. 8 shows a combination of the duty and the harmonic order.

FIG. 8 shows a combination of the duty and the harmonic order. In FIG. 8, a value shown at an intersection of the duty value (0.50 to 0.05) and the harmonic order value (1 to 10) corresponds to a magnification upon reduction of the transmission output power. As shown in FIG. 8, for example, in the case where the duty is 0.50, the magnification upon reduction of the transmission output power takes a significant value, that is, a value exceeding 0.00 in the odd orders including the fundamental wave (1, 3, 5, 7, 9). In the case where the duty is 0.50, therefore, the odd orders including the fundamental wave (1, 3, 5, 7, 9) must be used. On the other hand, in the case where the duty is 0.35 and 0.05, there is no magnification taking the value of 0.00 in any order; therefore, all the odd and even orders can be used. Alternatively, in the case where the duty is 0.45, 0.40, 0.30, 0.20, 0.15 and 0.10, there is only one magnification taking the value of 0.00 in the relevant orders; therefore, all the odd and even orders except the relevant order can be used. Moreover, in the case where the duty is 0.25, there are only two magnifications taking the value of 0.00 in the orders 4 and 8; therefore, all the odd and even orders except the orders 4 and 8 can be used. As described here, all the odd and even orders can be used depending on the selection of the duty.

What is claimed is:

1. A radio transmitter for modulating a carrier wave in a predetermined frequency with given information to transmit the modulation signal through an antenna having a predetermined resonance frequency f1, the radio transmitter comprising:
a frequency changing section that changes the frequency of the carrier wave,
wherein when the radio transmitter transmits the signal through the antenna, the frequency changing section sets the frequency of the carrier wave to a frequency of a harmonic wave f1 ×1/n, wherein n is a given integer of at least 2, which is a harmonic order, to change transmission output power.

2. The radio transmitter according to claim 1, further comprising:
a duty setting section that sets, when the carrier wave is a rectangular waveform in which ON periods and OFF periods are repeated in predetermined cycles, a duty of occupation by one of the ON periods and OFF periods in one cycle of the waveform,
wherein the frequency changing section performs the operation for changing the transmission output power when the duty setting section sets a predetermined duty.

* * * * *